US010625939B2

(12) United States Patent
Meurer

(10) Patent No.: US 10,625,939 B2
(45) Date of Patent: Apr. 21, 2020

(54) METHOD FOR PLACING PACKETS INTO AND/OR OUT OF STORAGE INTO/FROM A PARTICULAR STORAGE RACK AISLE OF A STORAGE RACK

(71) Applicant: Dematic GmbH, Heusenstamm (DE)

(72) Inventor: Hans Christoph Meurer, Roßdorf (DE)

(73) Assignee: Dematic GmbH, Heusenstamm (DE)

( * ) Notice: Subject to any disclaimer, the term of this patent is extended or adjusted under 35 U.S.C. 154(b) by 202 days.

(21) Appl. No.: 15/826,914

(22) Filed: Nov. 30, 2017

(65) Prior Publication Data

US 2018/0155127 A1 Jun. 7, 2018

(30) Foreign Application Priority Data

Dec. 2, 2016 (DE) .......................... 10 2016 123 357

(51) Int. Cl.
*B65G 1/04* (2006.01)
*B65G 47/51* (2006.01)
*B65G 1/137* (2006.01)

(52) U.S. Cl.
CPC ......... *B65G 1/0492* (2013.01); *B65G 1/0485* (2013.01); *B65G 1/1373* (2013.01); *B65G 47/5104* (2013.01)

(58) Field of Classification Search
CPC .. B65G 1/0485; B65G 1/0492; B65G 1/1373; B65G 1/1376; B65G 1/1378; B65G 47/5104
USPC .......................................................... 198/358
See application file for complete search history.

(56) References Cited

U.S. PATENT DOCUMENTS 3,771,679 A * 11/1973 Theml .................. B65G 1/1376
414/807
3,776,395 A * 12/1973 Lingg ................ B65G 47/5181
414/788.8
4,921,087 A * 5/1990 Nakamura ........... B65G 1/1375
198/341.03

(Continued)

FOREIGN PATENT DOCUMENTS

DE    102009029438 A1    2/2011
EP        1179491 A1 *    2/2002    ........... B65G 1/1378

(Continued)

OTHER PUBLICATIONS

European Search Report from corresponding European patent application EP17203814, indicated completed on Mar. 29, 2018.

*Primary Examiner* — James Keenan
(74) *Attorney, Agent, or Firm* — Gardner, Linn, Burkhart & Ondersma LLP

(57) ABSTRACT

A method for placing packets into and/or out of storage with or without loading aids into/from a particular storage rack aisle of a storage rack, wherein a distribution path conveys packets into storage and/or out of storage, wherein the distribution path comprises adjacent introducing and/or discharging devices which lead to incoming and/or outgoing paths which each supply goods to a storage rack aisle or remove goods therefrom. If the incoming/outgoing path of a destination storage rack aisle is overloaded, the packet is supplied to another incoming/outgoing path of another intermediate storage rack aisle, wherein a transfer takes place from the intermediate storage rack aisle to the destination storage rack aisle or vice-versa within the storage rack.

15 Claims, 1 Drawing Sheet

(56) References Cited

U.S. PATENT DOCUMENTS

| | | | | |
|---|---|---|---|---|
| 5,638,938 A * | 6/1997 | Lazzarotti | ............... | B65G 47/44 |
| | | | | 198/358 |
| 6,622,845 B1 * | 9/2003 | Heinrich | ................ | B65G 47/50 |
| | | | | 198/349 |
| 9,738,450 B2 * | 8/2017 | Lyon | .................... | B65G 1/1378 |
| 9,975,699 B2 * | 5/2018 | Yamashita | ........... | B65G 1/1378 |
| 10,322,880 B2 * | 6/2019 | Collin | .................... | B65G 1/127 |

FOREIGN PATENT DOCUMENTS

| | | | |
|---|---|---|---|
| EP | 2287093 | A1 | 2/2011 |
| EP | 2826728 | A1 | 1/2015 |
| FR | 2115486 | A1 | 7/1972 |
| JP | 2009208868 | A | 9/2009 |

\* cited by examiner

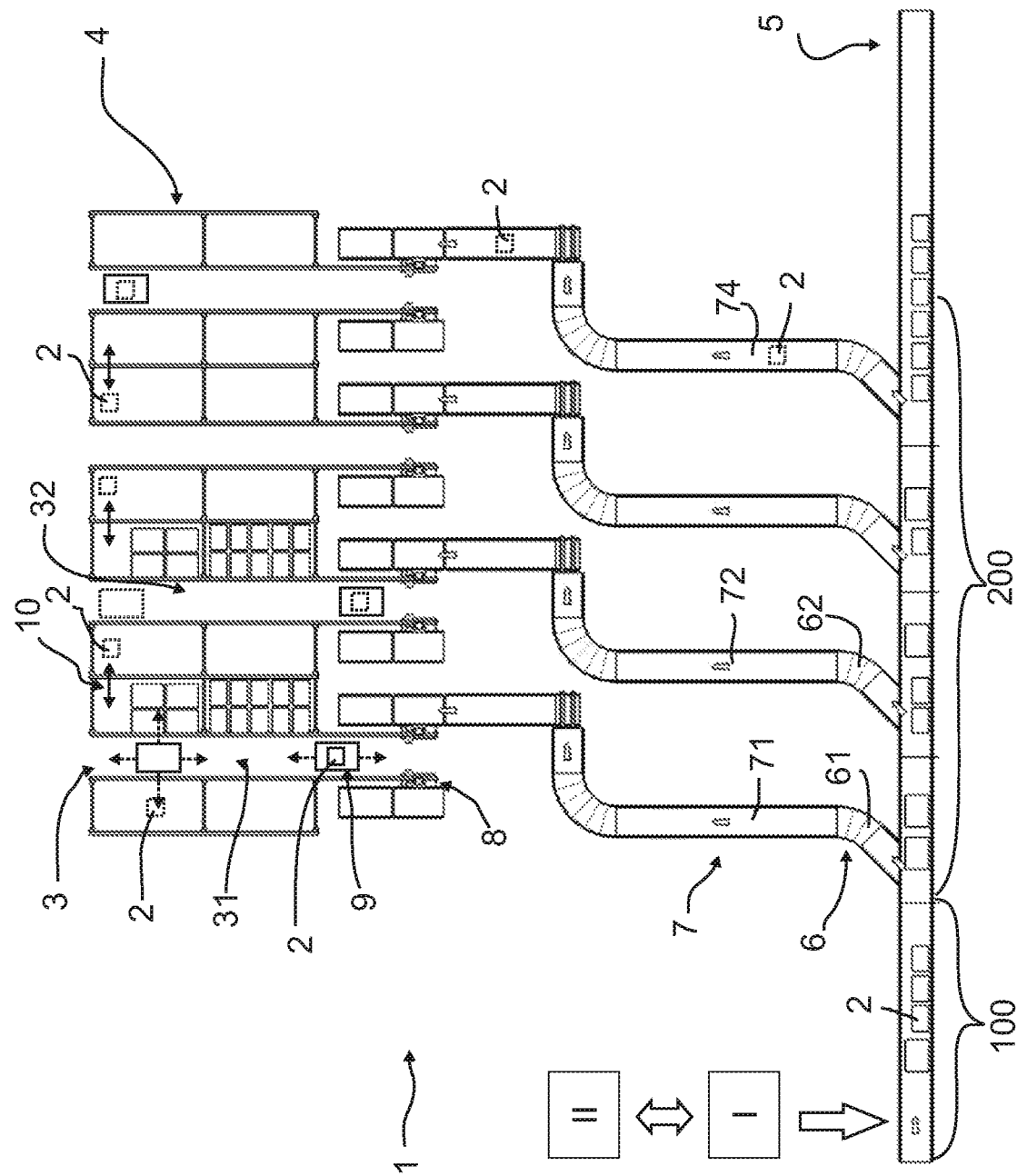

METHOD FOR PLACING PACKETS INTO AND/OR OUT OF STORAGE INTO/FROM A PARTICULAR STORAGE RACK AISLE OF A STORAGE RACK

CROSS REFERENCE TO RELATED APPLICATION

The present application claims priority of German patent application Ser. No. 102016123357.9 filed Dec. 2, 2016.

BACKGROUND OF THE INVENTION

The invention relates to a method for placing packets into and/or out of storage with or without loading aids into/from a particular storage rack aisle of a storage rack, wherein a distribution path conveys packets into storage and/or out of storage, wherein the distribution path comprises adjacent introducing and/or discharging devices which lead to incoming and/or outgoing paths which each supply goods to a storage rack aisle or remove goods therefrom.

In intralogistics, there is a trend towards ever larger installations. This results from generally increasing goods handling, smaller-sized deliveries (E commerce), and as a result more movements within a goods warehouse and from the combining of functions (regional/national/international, E commerce/shops trade channels).

In addition, the proportion of small-item stores for cartons and containers is also growing within the automated installations (goods warehouses). One reason for this is an increasing diversity of articles. Also, the desire for shorter times for reaching the articles in the inventory results in a shift from storing cartons on pallets to directly storing cartons in automatic warehouses.

Therefore, automated small-item stores with an extremely high capacity (e.g. 500,000 cartons and/or containers) are being built more and more. As the warehouse size grows compared with previously built installations, the capacity for placing goods into/out of storage (e.g. 10,000 loading units per hour) and the number of aisles (e.g. >30) also increase accordingly.

Normally, it is necessary for each aisle in the small-item store to be able to be reached by every incoming goods line.

This suggests to place goods into storage in the small-item store by means of a single distribution path having a branch for each individual aisle. A typical technical design of this type is the linear sorter having a capacity of >10,000 loading units per hour. The invention is provided in particular for such high-capacity installations, but it can also be used in installations with a lower capacity.

When transitioning from a distribution path of a storage system to incoming paths, loading units, e.g. packets, are greatly slowed down owing to a lower transport capacity on the incoming paths. In the case of a high discharge rate, this can result in overloading of an incoming path, and thus in an accumulation of goods, and a reduced capacity of the storage system. Conversely, the full capacity of the warehouse for removing goods from storage can only be achieved when the flows of goods leaving storage are distributed approximately uniformly across the aisles (the capacity of an aisle with an out-of-storage pass is substantially lower than the capacity of the gathering path).

DE 10 2009 029 438 A1 discloses a rack storage system having a rack store which comprises a plurality of rack rows arranged adjacent to each other and rack aisles which are each provided between rack rows arranged adjacent to each other, wherein the rack rows each form a plurality of rack levels in the vertical direction; one or more rail vehicles for receiving and transporting transport aids which are to be placed into or out of storage in/from the rack rows; first guide tracks for guiding the rail vehicles, wherein these first guide tracks extend in the longitudinal direction of a respective rack aisle so that the respective at least one rail vehicle can be displaced by means of at least one first guide track in the longitudinal direction of the respective rack aisle; one or more first vertical conveying devices for vertically conveying rail vehicles and/or transport aids across a plurality of rack levels; wherein at least one first vertical conveying device is arranged in a rack aisle or at least one first vertical conveying device is arranged in a rack row so that this first vertical conveying device is integrated in the rack-aisle unit formed from the rack rows and the rack aisles extending between rack rows.

The distances between the loading units on the distribution path are also short (typically ⅓ of the average length of the loading units) and therefore the discharge rate of the packets from the distribution path to an incoming path is limited, e.g. only every 4th loading unit can be discharged to the same destination. When supplying goods to the distribution path (e.g. sorter), this restriction can be maintained only with extensive outlay in relation to the supply. In the known technology, circuits are produced (when returning the non-discharged packets to the start of the distribution path) or loading units are stored in the wrong aisle. The second aspect results in limitations to the capacity, functionality, or delivery quality (incorrect deliveries) of the goods warehouse.

SUMMARY OF THE INVENTION

This problem is solved, according to an aspect of the invention, by a method for placing packets into and/or out of storage with or without loading aids into/from a particular storage rack aisle of a storage rack, in which packets are conveyed into storage and/or out of storage with a distribution path, wherein the distribution path comprises adjacent introducing and/or discharging devices which lead to incoming and/or outgoing paths which each supply goods to a storage rack aisle or remove goods therefrom. If the incoming/outgoing path of a destination storage rack aisle is overloaded, the packet is supplied to another incoming/outgoing path of another intermediate storage rack aisle, wherein a transfer takes place from the intermediate storage rack aisle to the destination storage rack aisle or from the storage rack aisle to the intermediate storage rack isle within the storage rack.

In accordance with an embodiment of the invention, in a method for placing packets into and/or out of storage with or without loading aids into/from a particular storage rack aisle of a storage rack, wherein a distribution path conveys packets into storage and/or out of storage, wherein the distribution path comprises adjacent introducing and/or discharging devices which lead to incoming and/or outgoing paths which each supply goods to a storage rack aisle or remove goods therefrom, a high capacity for placing goods into and out of storage is ensured by virtue of the fact that if the incoming/outgoing path of a destination storage rack aisle is overloaded the packet is supplied to another incoming/outgoing path of another intermediate storage rack aisle, wherein then a transfer takes place from the intermediate storage rack aisle to the destination storage rack aisle or vice-versa within the storage rack.

Such a diversion of packers to an alternative route if an incoming/outgoing path is overloaded has the advantage that all available incoming/outgoing paths can be loaded uniformly. As a result, the capacity of a storage system for placing goods into/out of storage can be utilized optimally and a maximum capacity for placing goods into/out of storage can be achieved because on the one hand empty running and on the other hand accumulation of goods on an incoming/outgoing path can be avoided. By way of a subsequent aisle correction, i.e. a transfer from the intermediate storage rack aisle to the destination storage rack aisle, the packet can be supplied to its originally intended storage location.

In accordance with this embodiment of the invention, provision is thus made that when placing goods into storage and in the case of overloading of an incoming path, the packet reaches another intermediate storage rack aisle by being supplied to another incoming path via another introducing device.

In installations with a high capacity, i.e. many thousands of packets per hour, the distances between the packets on the distribution path are short. It is thus advantageous, when placing packets into storage, to ensure a uniform distribution to the available incoming paths as early as possible in order to counteract overloading.

It is also advantageous that the packet, if an outgoing path is overloaded, is supplied to another storage rack aisle prior to being removed from storage via a transfer between the storage rack aisles and is removed from storage via another outgoing path.

In a similar manner to placing goods into storage, accumulations can also occur when removing goods from storage at the transition from one outgoing path to the distribution path, i.e. when discharging goods. This is e.g. the case when there is no sufficient gap in the packet sequence at a discharging device when a packet arrives in the conveyor sequence of the distribution path. In this case, the overloading can be counteracted by removing the packet from storage via another outgoing path. If a plurality of packets are conveyed from the same storage rack aisle, overloading of the associated outgoing path can also be avoided by the packets being removed from storage via adjacent outgoing paths.

Removing the packet from storage via an adjacent outgoing path is effected via a transfer between the storage rack aisles and subsequent transfer of the packet to a transfer element, such as e.g. a goods lift which transfers the packet to the outgoing path.

The transfer between the storage rack aisles is effected by a cross-conveyance, i.e. rack storage locations of abutting racks are used to pass packets from one side of the rack to the next. This can be effected e.g. by rack serving apparatuses which move in the storage rack aisles and are provided with load-receiving means.

The rack serving apparatuses can store the transport units in cross-conveyance locations—provided for exchange purposes—normally or two-deep or multiple times-deep. The rack serving apparatuses of one aisle can thus store the transport units in the cross-conveyance locations so deep that they are already to be attributed to the adjacent rack and can be reached "normally" by the correspond rack serving apparatus.

For this purpose, the load-receiving means, e.g. telescopic rail arms, can have an extended reach. This is particularly useful if the rack serving apparatuses are single-level rack serving apparatuses, in particular shuttles or satellite vehicles.

The transfer between the racks can also be effected in an active or passive manner in terms of the rack serving apparatus, i.e. on the one hand the cross-conveyance location can be simply a passive set-down surface on which the rack serving apparatus of one aisle sets down transport units (quasi places them in storage) and from which the rack serving apparatus of the adjacent aisle receives transport units (quasi removes them from storage). This process can take place for each rack storage location or cross-conveyance location always only in one direction or in both directions.

On the other hand, it is likewise possible to equip the cross-conveyance location with corresponding materials handling technology, such as driven rollers, a slack roller conveyor with a pitch, conveyor belts, etc. Then, the rack serving apparatus can set down the transport units and the materials handling technology of the cross-conveyance location effects the transport.

The use of transversely moving shuttles or so-called roaming shuttles, which move between aisles or additional shuttles, which are used for the pure cross-transport between the intermediate storage aisle and end storage aisle, is also feasible. Of course, other shuttle types such as multi-level rack serving apparatuses and warehouses with pre-zones for the cross-transport can also be used.

In a particularly preferred variant, level rack serving apparatuses of the shuttle type are used in the rack store, which effect a goods exchange between the aisles via dedicated cross-conveyance locations by deeper storage, as described in the proprietary DE 10 2012 107 176 A1. Therefore, materials handling technology in the pre-zone can be substantially avoided.

In accordance with an embodiment of the invention, the final destination storage locations are predetermined in the case of placing goods into storage, especially as it is intended to discharge from a specific aisle of the storage to a following order fulfillment, for which single lifts can even be directly linked to a picking station. However, the goods should be continued to be placed into storage continuously, even when the conveying path or the store for this destination storage location is over-filled and therefore in order to avoid accumulations or an interruption in the process of placing goods into storage, all articles are released for storage and, if necessary, other intermediate destinations are reached for continuously placing goods into storage and transferring to the final destination location can occur subsequently. As a result, a high, uninterrupted storage throughput is achieved without an interruption in the case of overloading or the need for additional buffers. As a result, a "safety" reserve—which is otherwise required and would be necessary in a rigid system in order to avoid system blockages/accumulations—is reduced or completely avoided.

In contrast to DE 10 2009 029 438 A1, additional active materials handling technology to transfer articles between the aisles is not used in the warehouse. In the present case, goods are exchanged between aisles, when necessary, via the described cross-conveyance locations by means of the rack serving apparatuses already provided. This makes the system more flexible because in principle each storage location can be formed as a cross-conveyance location between the aisles. In addition, a large amount of space is saved.

These and other objects, advantages, purposes, and features of the present invention will become apparent upon review of the following specification in conjunction with the drawings.

BRIEF DESCRIPTION OF THE DRAWINGS

An exemplified embodiment of the invention will be explained in greater detail hereinafter with reference to the drawing.

FIG. 1 shows a schematic plan view of a conveying system and a rack store for placing packets into and out of storage.

DETAILED DESCRIPTION OF THE PREFERRED EMBODIMENT

FIG. 1 shows a plan view of a conveyor system 1 for placing packets 2 into storage in storage rack aisles 3, which are formed by storage racks 4, which are arranged in parallel with and opposite each other and have a plurality of levels. The conveying system 1 includes a distribution path 5 which conveys the packets 2 into and out of storage. Incoming and outgoing paths 7 are arranged between the distribution path 5 and the storage racks 4. These paths are connected to the distribution path 5 by introducing and discharging devices 6 and are connected to the storage rack aisles 3 via goods lifts 10. Adjacent incoming/outgoing paths 71 and 72 are arranged in parallel with each other.

The packets 2 are transported by the goods lifts 8 from the incoming paths 7 into the rack levels of the storage racks 4 or from the storage levels to the outgoing paths 7. The packets 2 are transported within the rack levels of the storage racks 4 via rack serving apparatuses 9.

Preferably, a rack serving apparatus 9, e.g. a shuttle vehicle, moves on each rack level. The rack serving apparatus 9 is equipped with load-receiving means, e.g. telescopic arms, which permit a transfer up to a transport surface of the rack serving apparatus 9 or down from a transport surface of a rack serving apparatus 9.

The method when placing packets 2 into storage will be explained hereinafter with the aid of FIG. 1.

In the region of the supply area 100, the barcode etc. of the packet is read at I by a scanner. This information is exchanged with the master warehouse management controller II which in turn determines a destination aisle for the scanned packet and thus establishes the subsequent discharging device. In this regard, criteria are selected from, e.g. aisle filling level, how the products or groups of products are held together or distributed or consolidation of orders, etc.

Then a check is made as to whether the determined destination storage rack aisle can be reached or whether it is overloaded and can only be reached via an intermediate storage rack storage aisle. In the affirmative, the packets are simply discharged, as described hereinafter, in the region 200 onto the direct incoming path:

A packet 2 is then conveyed on the distribution path 5 for placing into storage and after passing a discharging device 61 it passes via the incoming path 71 to the goods lift 8. From the goods lift 8, the packet 2 is received by a rack serving apparatus 9 and thus placed into storage into a destination rack aisle 31 or corresponding storage rack of the aisle.

However, if it is determined that the destination storage rack aisle cannot be reached or is overloaded, a bypass storage rack aisle (intermediate storage rack aisle) is determined. Overloading can be assumed e.g. if the time interval between products being discharged into the incoming path of the destination storage rack aisle does not reach a predetermined threshold value and/or too many packets are already (still) in transit on the incoming path.

The determination of the availability of the aisles can be tracked and determined cyclically.

If the use of a bypass storage rack aisle (intermediate storage rack aisle) or incoming path (or outgoing path) is required, this can be determined using the predetermined criteria. In this respect, a check is made as to whether it is allowed or possible to store products into the determined intermediate storage rack aisle (similar to above). The distance to the destination storage rack aisle is kept as small as possible when determining the intermediate storage rack aisle. If a plurality of intermediate storage rack aisles are possible, a check can then be made as to which corresponding incoming path has fewer packets and for which incoming path the fewer discharges have taken place in a particular time frame.

If the incoming path 71 of the destination storage rack aisle is overloaded, which is evident e.g. in an accumulation, the packet 2 is supplied by another discharging device, e.g. the adjacent discharging device 62, to another incoming path 72 as a bypass route to the determined bypass storage rack aisle or intermediate storage rack aisle 32. Therefore, the overloaded incoming path 71 is bypassed and thus relieved. As a result, the packet 2 is located on an incoming path which is not connected to the original destination storage rack aisle 31. The packet 2 enters the intermediate storage rack aisle 32 via this alternative incoming path 72.

From there, the packet is supplied to its destination storage rack aisle 31 via a transfer between the storage rack aisles 32 and 31. This transfer is effected e.g. by a rack serving apparatus and via cross-conveyance. This means in the present case that the packet 2 is passed through rack storage locations of adjoining storage racks 4 and thus reaches the respective next storage rack side and the next storage rack aisle 31.

The storage racks 4 contain, on every level, particular exchange locations 10 for the cross-conveyance of packet 2 from one rack 4 into the adjacent rack 4, so that the packets 2 can always be exchanged within the storage racks 4. The rack serving apparatuses 9 or the load-receiving means thereof can thus set down packets 2 in the cross-conveyance locations 10 and can push same into (or through) the corresponding location in the adjacent rack 4.

The transfer between the racks 4 takes place in this case in a passive manner with respect to the rack, i.e. the cross-conveyance location 10 is used as a passive set-down surface on which the rack serving apparatus 9 of one aisle 3 actively sets down packets 2, or places same into storage, and from which the rack serving apparatus 9 of the adjacent aisle 3 receives the packets 2 or removes same from storage. Therefore, only the load-receiving means of the rack serving apparatus is used. A further drive or materials handling technology in the rack is not provided in this case. This process takes place for each cross-conveyance location 10 in one direction or in both directions.

It is understood that a corresponding "bypass" can also occur via more spaced apart rack aisles and transfer locations 10, as illustrated by the dashed variants in the FIGURE. For instance, e.g. a packet 2 can be diverted via the path 74 and the fourth aisle and can reach the destination aisle 31 via multiple transfers via a plurality of aisles.

The method when removing packets 2 from storage will be explained hereinafter with the aid of FIG. 1.

The packet 2 leaves a storage rack location in the rack storage aisle 31, e.g. by being removed from the storage rack location by a rack serving apparatus, and is transferred to the goods lift 8. The goods lift 8 then transfers the packet 2 to the outgoing path 71 which transports the packet 2 towards the discharging device 61. The packet 2 reaches the distribution path 5 via the discharging device 61.

If the outgoing path 71 is overloaded, the packet 2 is transferred to the intermediate storage rack aisle 32 by cross-conveyance, e.g. by a rack serving apparatus 9, and from there is transferred to a goods lift 8. From there, the packet 2 reaches the outgoing path 72 and the discharging device 62, via which the packet 2 is supplied to the distribution path 5.

The method has been described with the aid of incoming/outgoing paths 71 and 72; of course, the method functions equivalently even with a larger number of incoming/outgoing paths 7 and storage rack aisles 3. Likewise, a diversion via an incoming/outgoing path 7 other than the adjacent one is feasible.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. Method for placing packets into and/or out of storage with or without loading aids into/from a particular storage rack aisle of a storage rack, said method comprising:
   at least one chosen from conveying packets into storage and conveying packets out of storage;
   wherein said conveying packets into storage includes directing a packet from a distribution path to an incoming path, the incoming path adapted for supplying goods to a particular destination storage rack aisle corresponding to the incoming path, and supplying the packet from the incoming path to the corresponding destination storage rack aisle;
   wherein said conveying packets out of storage includes removing a packet from a storage rack aisle and directing the packet to an outgoing path corresponding to that storage rack aisle, and directing the packet from that outgoing path to the distribution path;
   wherein if an incoming path corresponding to a particular destination storage rack aisle is overloaded when a packet is to be supplied to that particular destination storage rack aisle, directing the packet from the distribution path to another incoming path corresponding to an intermediate storage rack aisle within the storage rack, the another incoming path is in connection with the distribution path, supplying the packet from the another incoming path into the corresponding intermediate storage rack aisle, and transferring the packet from the intermediate storage rack aisle to the particular destination storage rack aisle within the storage rack;
   wherein if the outgoing path corresponding to a particular storage rack aisle is overloaded when a packet is to be removed from that particular storage rack aisle, transferring the packet to an intermediate storage rack aisle within the storage rack, removing the packet from that intermediate storage rack aisle to an outgoing path corresponding to that intermediate storage rack aisle, and directing the packet from that outgoing path to the distribution path; and
   wherein whether a particular incoming path or a particular outgoing path is overloaded is determined based on an accumulation of packets at that particular path.

2. Method as claimed in claim 1, wherein the transferring the packet from the intermediate storage rack aisle to the destination storage rack aisle takes place using a cross-displacement within the storage rack.

3. Method as claimed in claim 2, wherein the cross-displacement takes place using cross-conveyance locations.

4. Method as claimed in claim 3, wherein the cross-conveyance locations each comprises a rack serving apparatus which actively pushes through the packet from the intermediate storage rack aisle to an adjacent rack aisle using dedicated load-receiving devices.

5. Method as claimed in claim 4, wherein the rack serving apparatus is a shuttle vehicle which effects a packet exchange between the aisles via dedicated cross-conveyance locations.

6. Method as claimed in claim 1, wherein said directing a packet from a distribution path to an incoming path includes directing the packet to the incoming path with an introducing device disposed between the distribution path and the incoming path and wherein said directing the packet from the outgoing path to the distribution path including directing the packet from the outgoing path with a discharging device disposed between the outgoing path and the distribution path.

7. Method as claimed in claim 6, wherein the transferring the packet from the intermediate storage rack aisle to the destination storage rack aisle takes place using a cross-displacement within the storage rack.

8. Method as claimed in claim 7, wherein the cross-displacement takes place using cross-conveyance locations.

9. Method as claimed in claim 8, wherein the cross-conveyance locations each comprises a rack serving apparatus which actively pushes through the packet from the intermediate storage rack aisle to an adjacent rack aisle using dedicated load-receiving devices.

10. Method as claimed in claim 9, wherein the rack serving apparatus is a shuttle vehicle which effects a packet exchange between the aisles via dedicated cross-conveyance locations.

11. Method as claimed in claim 1, further comprising if a particular destination storage rack aisle is overloaded when a packet is to be supplied to that particular destination storage rack aisle, directing the packet from the distribution path to another incoming path corresponding to an intermediate storage rack aisle within the storage rack, the another incoming path is in connection with the distribution path, supplying the packet from the another incoming path into the corresponding intermediate storage rack aisle, and transferring the packet from the intermediate storage rack aisle to the particular destination storage rack aisle within the storage rack, wherein whether a storage rack aisle is overloaded is determined based on at least one chosen from a rate of goods being supplied to that storage rack aisle and a rate of goods being discharged from that storage rack aisle.

12. Method as claimed in claim 11, wherein the transferring the packet from the intermediate storage rack aisle to the destination storage rack aisle takes place using a cross-displacement within the storage rack.

13. Method as claimed in claim 12, wherein the cross-displacement takes place using cross-conveyance locations.

14. Method as claimed in claim 13, wherein the cross-conveyance locations each comprises a rack serving apparatus which actively pushes through the packet from the intermediate storage rack aisle to an adjacent rack aisle using dedicated load-receiving devices.

15. Method as claimed in claim 14, wherein the rack serving apparatus is a shuttle vehicle which effects a packet exchange between the aisles via dedicated cross-conveyance locations.

\* \* \* \* \*